United States Patent
Casamassima et al.

(10) Patent No.: US 11,714,166 B2
(45) Date of Patent: Aug. 1, 2023

(54) KEY FOB LOCALIZATION INSIDE VEHICLE

(71) Applicant: NXP B.V., Eindhoven (NL)

(72) Inventors: Filippo Casamassima, Graz (AT); Wolfgang Eber, Graz (AT); Stefan Tertinek, Graz (AT)

(73) Assignee: NXP B.V., Eindhoven (NL)

(*) Notice: Subject to any disclaimer, the term of this patent is extended or adjusted under 35 U.S.C. 154(b) by 409 days.

(21) Appl. No.: 16/830,738

(22) Filed: Mar. 26, 2020

(65) Prior Publication Data
US 2021/0302536 A1    Sep. 30, 2021

(51) Int. Cl.
| | |
|---|---|
| G01S 7/41 | (2006.01) |
| G06N 20/00 | (2019.01) |
| B60R 25/01 | (2013.01) |
| B60R 25/24 | (2013.01) |
| G01S 13/76 | (2006.01) |
| H04W 4/48 | (2018.01) |
| G01S 5/00 | (2006.01) |

(52) U.S. Cl.
CPC .............. G01S 7/412 (2013.01); B60R 25/01 (2013.01); B60R 25/245 (2013.01); G01S 5/00 (2013.01); G01S 13/767 (2013.01); G06N 20/00 (2019.01); H04W 4/48 (2018.02); *G01S 7/417* (2013.01)

(58) Field of Classification Search
CPC ........ G01S 5/0273; G01S 13/765; G01S 5/06; G01S 5/14; G01S 3/74; G01S 13/767; G01S 7/415; G01S 11/02; G01S 2013/468; H04W 64/00; H04W 4/029; H04W 4/023; H04L 45/24
See application file for complete search history.

(56) References Cited

U.S. PATENT DOCUMENTS

| | | | |
|---|---|---|---|
| 9,602,972 B2 | 3/2017 | Maranò et al. | |
| 2017/0212210 A1* | 7/2017 | Chen | ..................... G01S 5/0226 |
| 2019/0297457 A1 | 9/2019 | Ledvina et al. | |
| 2020/0005566 A1* | 1/2020 | Jain | ..................... G07C 9/00309 |
| 2020/0348406 A1* | 11/2020 | Jain | ..................... G05D 1/0231 |
| 2021/0067915 A1* | 3/2021 | Mao | ..................... G01S 5/0273 |

FOREIGN PATENT DOCUMENTS

DE    112018000346 T5 *    9/2019    ........... B60R 16/023

OTHER PUBLICATIONS

Marano et al., "NLOS Identification and Mitigation for Localization Based on UWB Experimental Data," IEEE Journal on Selected Areas in Communications, vol. 28, No. 7, Sep. 2010, pp. 1026-1035; 10 pages.
Niitsoo et al., "A Deep Learning Approach to Position Estimation form Channel Impulse Responses," Multidisciplinary Digital Publishing Institute, Sensors 2019, 19, 1064; 23 pages.

* cited by examiner

*Primary Examiner* — Khalid W Shaheed (57) ABSTRACT

A system for localizing an ultra-wide band (UWB) apparatus comprises a UWB transceiver that identifies and extracts features of at least one channel impulse response (CIR); and a special-purpose processor that applies a machine learning classification process to the extracted CIR features to localize the UWB apparatus in a vehicle.

18 Claims, 7 Drawing Sheets

KEY FOB LOCALIZATION INSIDE VEHICLE

FIELD

The present disclosure relates generally to ultra-wideband (UWB) ranging technologies, and more specifically to the implementation of a combination of machine learning and UWB technologies to determine a location of a key fob inside a vehicle.

BACKGROUND

Key fobs are commonly used to provide keyless entry to modern vehicles, such as automobiles, trucks, boats, and so on. For example, a key fob can remotely transmit an electronic signal to instruct the vehicle to lock or unlock its doors when the user is nearby, activate the ignition to start the engine, and so on.

Ultra-wide band (UWB) technology is implemented in wireless electronic communication transceivers because of its exceptional positioning accuracy and high data throughput as compared to other wireless technologies, in particular, those including Internet-of-Things (IoT) devices. One application includes the implementation of a UWB computer chip in a key fob, smartphone, or other remote mobile electronic device for the remote digital access and control of a vehicle's computer processors via one or more antenna anchors mounted in the automobile in order to lock or unlock a door of the vehicle or other remote functions. For example, when the key fob is in the vehicle driver's possession, the vehicle can detect activity such as the driver approaching the vehicle or pulling on the door handle, and begin to search for the key fob outside the vehicle cabin. Once the fob has been authenticated, the doors unlock automatically A feature of modern remote keyless vehicles prevents the vehicle from automatically locking itself when the key fob is inside the vehicle. However, localization of a UWB key fob inside a vehicle's cabin can be challenging. In particular, UWB radio devices execute distance estimation algorithms, such as ToA, time of flight (ToF), time difference of arrival (TDoA), angle of arrival (AoA), and so on, which may be prone to error and miscalculation caused by environmental conditions, or the coexistence of humans, animals, luggage, or other objects inside vehicle cabin with the fey fob.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
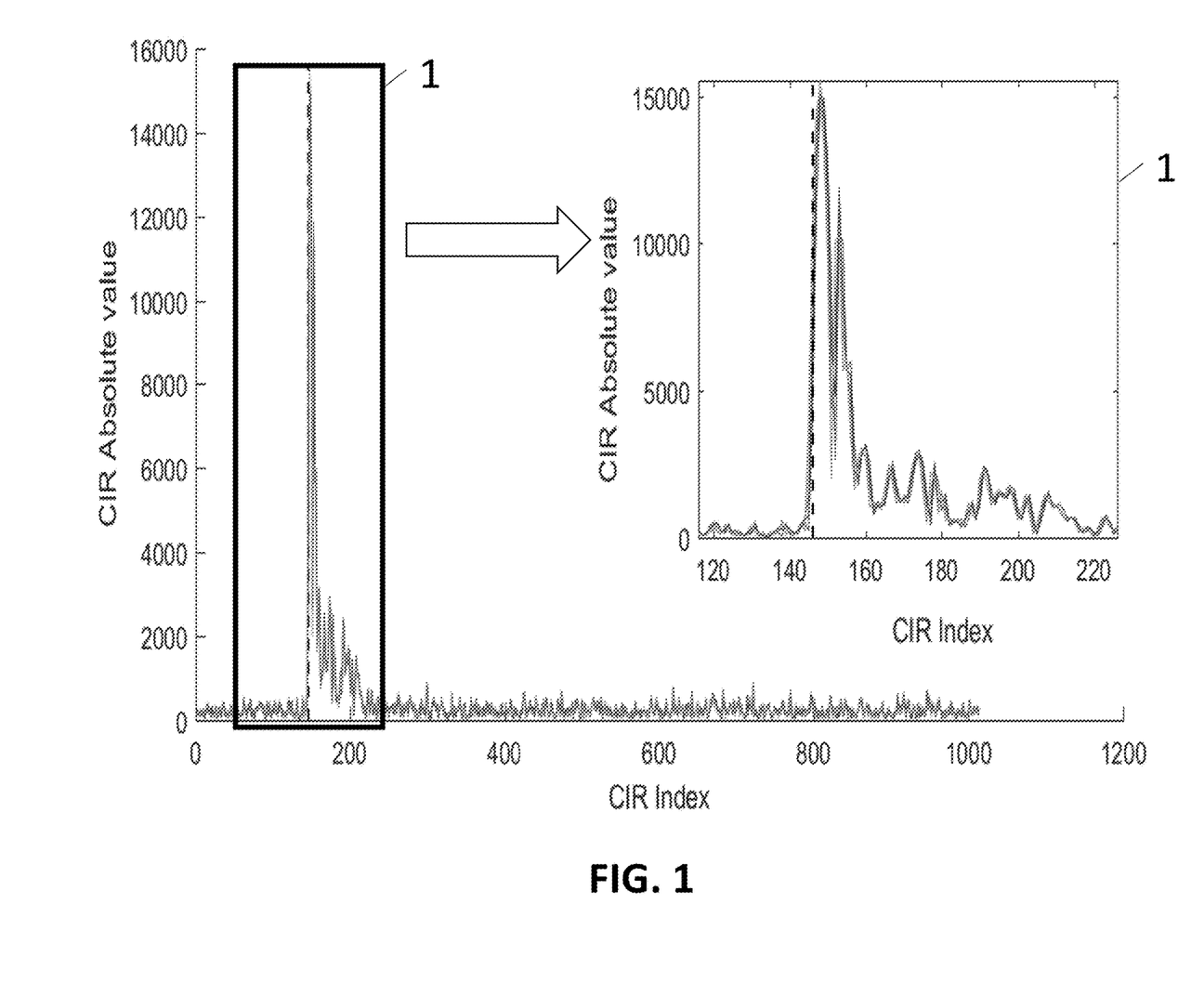
FIG. 1 is a graph illustrating a channel impulse response (CIR) produced in an environment in which embodiments of the present inventive concepts are practiced.
Figure 2:
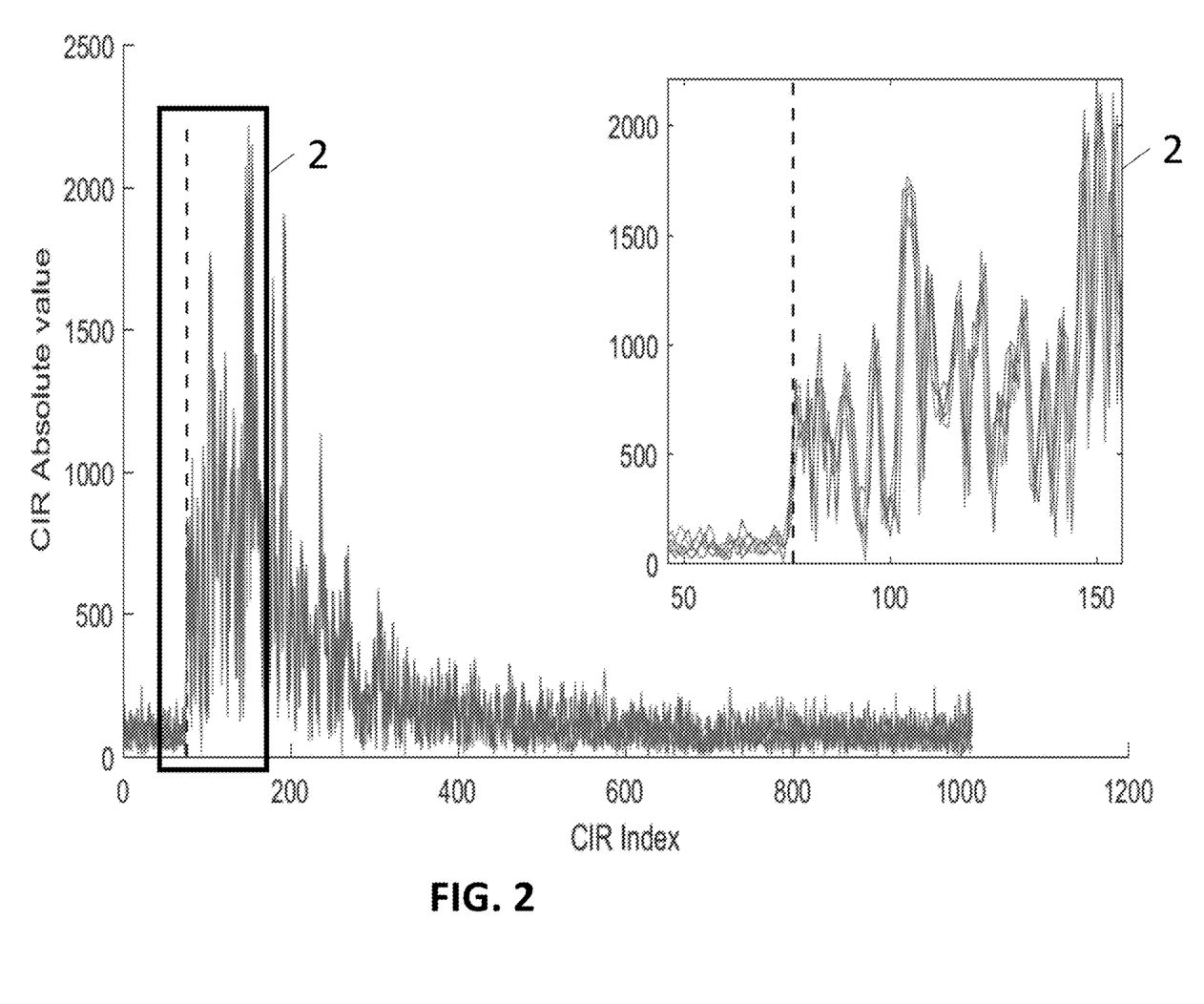
FIG. 2 is a graph illustrating a channel impulse response produced in a dense multipath environment in which embodiments of the present inventive concepts are practiced.

UWB radio devices typically require CIR signal measurements to estimate when the signal reaches the receiver. A measured CIR is determined from a cross-correlation function computed according to the IEEE 802.15.4a standard, namely, a comparison between a received pulse sequence signal and a reference or expected pulse over a data packet preamble. Once acquired, the CIR is used to estimate the instant of a first path between the transmitting and receiving UWB radio devices. The example shown in the graphs of FIGS. 1 and 2 illustrates the CIR for an environment with not many reflections and a second path that is clearly distinguishable from the first path, and is also possible to identify further reflections.

However, a relevant environmental condition with respect to use by UWB radio devices includes the presence of a "dense multipath" environment when attempting to localize a key fob inside a vehicle cabin, for example, where the vehicle detects an activity such as a user attempting to open a vehicle door by pulling on the door handle and in response begins to search for the key fob. Referring to FIG. 2, in a dense multipath environment, the CIR comprehend reflections can be difficult to distinguish. In particular, conventional search and distance estimation algorithms, or localization algorithms, while addressing some error in distance and position estimations, are generally inadequate for the detection of a direct path signal in the presence of a dense multipath condition because they emphasize the gathering of distance information from the UWB devices and must account for signal (e.g., radio frequency (RF)) reflections on surfaces, scattering, and the like along the line-of-sight (LOS) path between the UWB transmitter and receiver, which can create interference, and therefore result in signal distortion at the receiver antenna. The multipath results in an incorrect time-of-arrival (ToA) estimation, and accordingly, an erroneous distance and position estimation. An analytical calculation of the CIR signal data may nevertheless be performed, but may skew a distance estimate calculation between transmitting and receiving UWB radio devices when considering a dense multipath CIR. Therefore, some "dense multipath" environments are quite unfavorable for localization using UWB devices.

In brief overview, embodiments of the present inventive concepts combine computer-executed machine learning processes with features of a measured CIR rather than relying on distance-only information to estimate a location of a key fob or related UWB apparatus inside a vehicle notwithstanding the presence of a dense multipath environment. In preferable embodiments, a machine learning technique is provided that includes a classification algorithm to estimate the location of the key fob in a vehicle cabin or other enclosed area that is prone to dense multipath conditions. The machine learning approach recognizes that a CIR has characteristics or features, as shown in FIGS. 1 and 2, which identifies the CIR as unique with respect to various locations inside the vehicle cabin. Unlike the complexities and substantially large processing requirements of deep learning techniques, a machine learning technique recognizes that it is not possible to estimate the exact coordinates of the key fob, but instead relies on the characteristics of a signal to identify a location albeit no x-y coordinate determination in addition to identifying the presence of objects, persons, or the like in the vicinity of the key fob. For example, machine learning algorithms are executed that learn from defined specific CIR features, and continues to learn, or train, based on the learned CIR feature data for the classification algorithm. Also, due to fewer computational performance requirements than a deep learning algorithm, a simple machine learning model can be executed at a UWB anchor. Machine learning algorithms permit CIR features to be selected for training a classifier. In this manner, it is possible to identify a tradeoff between the computational complexity of the features and a desired accuracy in order to reduce the computational requirements. Accordingly, a classification algorithm when executed can be trained to identify whether the key fob is on the passenger seat, the driver seat, the car floor, the trunk, the engine, and so on, notwithstanding the possible presence of various obstructions in the vehicle such as a human body. Another feature is that a single classifier is required per UWB anchor in the vehicle, and therefore, fewer anchors and less complexity. Another advantage over deep learning algorithms is that embodiments of the machine learning algorithms process CIR features or characteristics for training the algorithm.

In some embodiments, a localization system comprising UWB transceivers such as a key fob, anchor(s), and a machine language computer (not shown) can exchange data to process a combination of CIR data and machine language-derived data from the CIR, for example, to derive an accurate estimate of a distance between the UWB transceivers from the anchor(s). Distance data may be used to train the machine language and derive data from the CIR. The decision that addresses the localization determination may be based on two inputs, namely, the CIR and the machine-language derived CIR data. For example, a "hybrid" system may therefore process a combination of CIR data and machine-language derived data from a CIR as well as distance data from one or more anchors. The system may process both inputs to remove any ambiguity of CIR-based, distance-only determinations.

Figure 3:
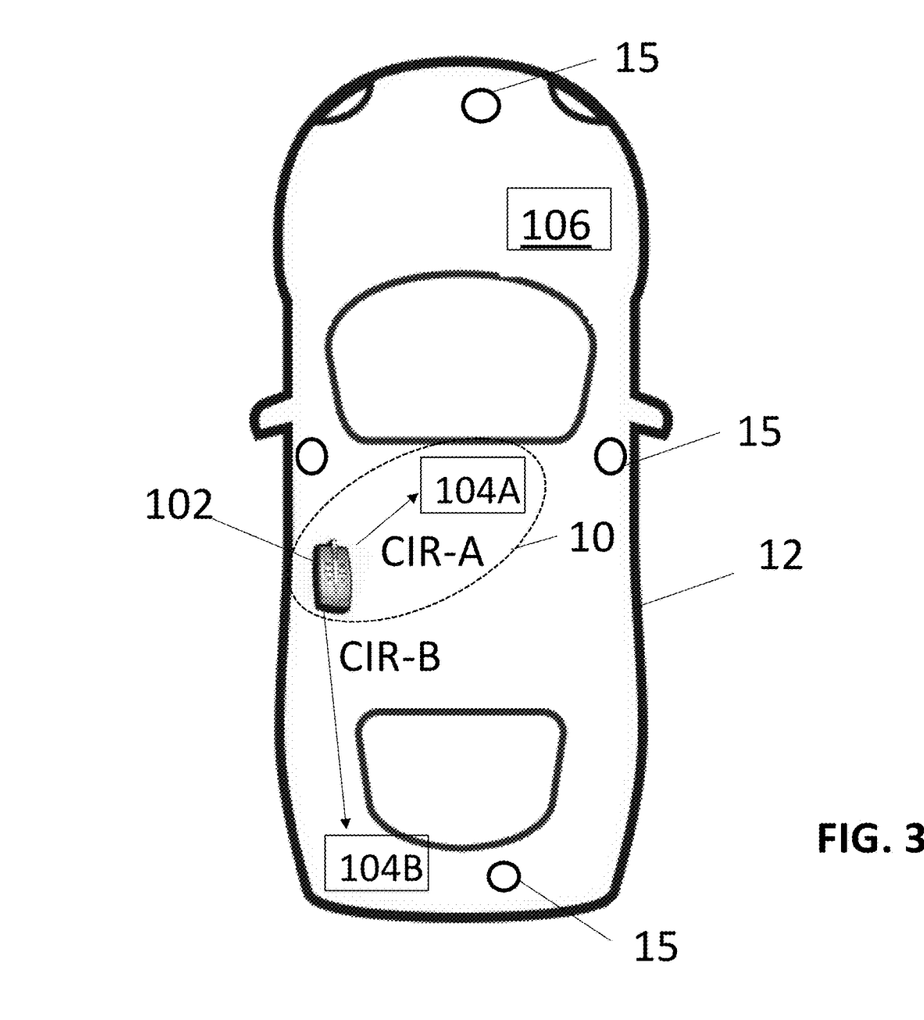
FIG. 3 is an illustrative view of an ultra-wideband (UWB) ranging system implemented in a vehicle, in accordance with some embodiments.

FIG. 3 is an illustrative view of an ultra-wideband (UWB) ranging system implemented in a vehicle, in accordance with some embodiments.

A key fob 102 ranging initiator apparatus is inside a vehicle 12, for example, a cabin, cockpit, galley, of an automobile, truck, airplane, or boat, but not limited thereto. The key fob 102 is generally portable and includes a transmitter, for example, activated by a button, voice, or other activation mechanism for sending commands to one or more vehicle-mounted transceivers 104A, 104B (generally, 104) to perform well-known functions such as communicating with various sensors 15 and associated mechanisms and on-board computers for unlocking doors, starting of the vehicle engine, and so on. The transceivers 104 may be both inside and outside the vehicle 12, for example, and may include external antennas at various locations of the vehicle such as the door handle, mirrors, trunk, bumper, roof, dashboard, and so. As described herein, a system including the key fob 102, vehicle-mounted transceivers 104, and a machine learning system 148 can localize the key fob 102 inside the vehicle 12 even in a dense multipath environment, and can therefore be used in applications related to remote keyless entry, remote engine start, remote door lock/unlock, and so on.

For example, when the vehicle is triggered, for example, by a sensor 15 detecting that the door handle has been touched, a signal is transmitted from the antenna to the key, where in authentication scheme ensues after which the vehicle can be automatically unlocked. In some embodiments, the transceivers 104 are UWB anchors, which exchange data with the key fob 102 at a predetermined UWB frequency band which provides a significant communication range, for example, up to several hundred feet, or more. In some embodiments, the UWB transceivers 104 or the like in compliance with an IEEE 802.15.4 system, which typically transmit 500 MHz or 1 GHz pulses but not limited thereto.

The vehicle 12 may also include a body control module (BCM) 106 or related electronic control unit for the various sensors 15 or on-board computers the like to control the electronic accessories in a vehicle's body, such as the door locks, ignition system, power windows, lights, air conditioning unit, and so on. The vehicle 12 may include a data bus (not shown) and/or other network devices for permitting data exchanges between the BCM 106, sensors 15, on-board computers (not shown), actuating relays (not shown), and key fob 102.

Figure 4:
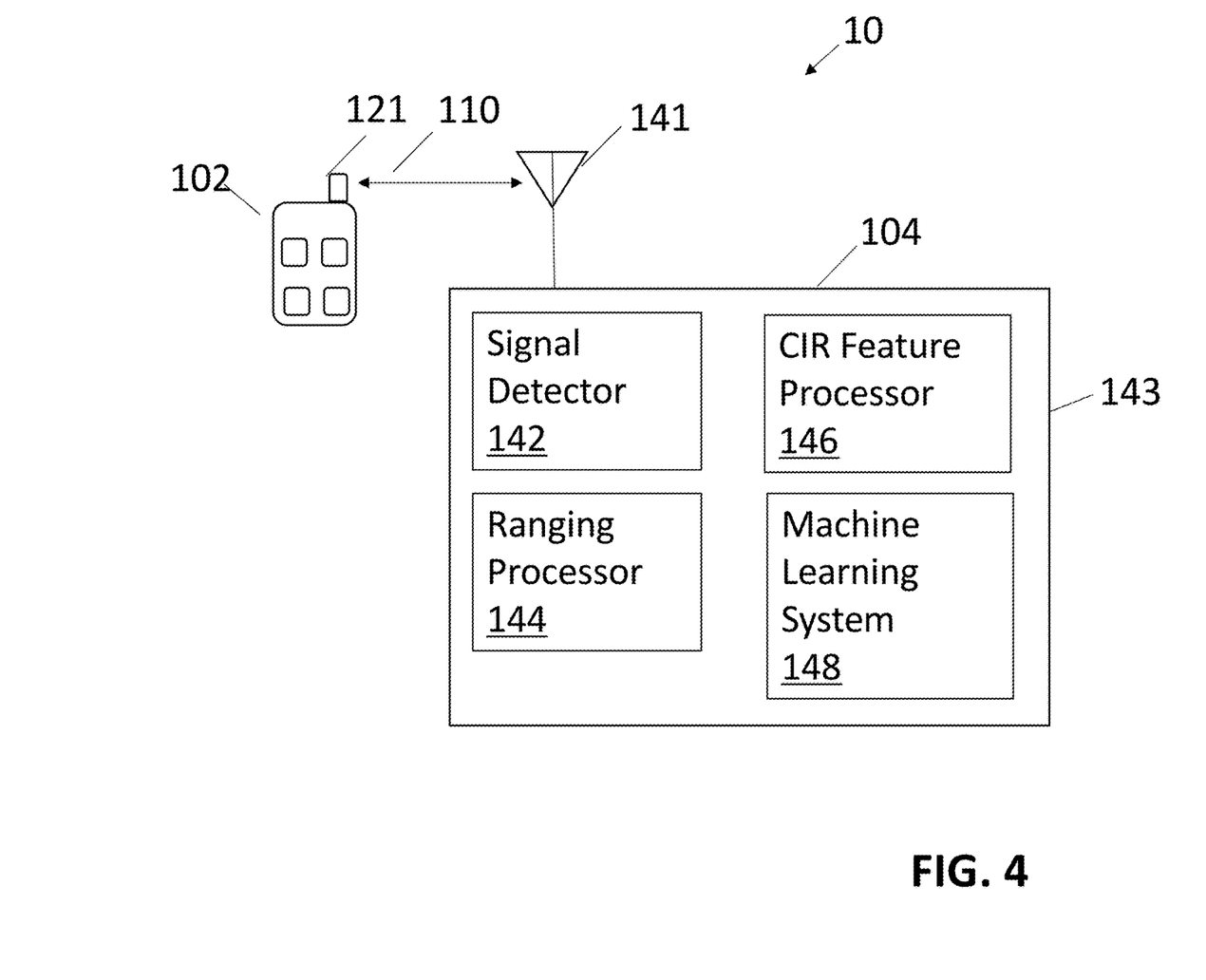
FIG. 4 is a block diagram of a UWB communication system, in accordance with some embodiments.

FIG. 4 is a block diagram of a UWB communication system 10, in accordance with some embodiments. In some embodiments, the UWB communication system 10 complies with the IEEE 802.15.4 technical standard, incorporated by reference herein in its entirety. As shown, a key fob 102 and a vehicle-mounted UWB transceiver 104 exchange data via one or more transmission channels 110, collectively referred to as a communication path or link. Embodiments of the UWB communication system 10 may be implemented in the key fob 102, UWB transceivers 104, BCM 106, and/or sensors 15 of FIG. 3.

The key fob 102, also referred to as a first UWB wireless transceiver, may include an omnidirectional antenna 121 and corresponding processor for transmitting data using techniques to operate as a ranging initiator which cause a spreading of the radio energy over a UWB band of a transmission channel 110. In some embodiments, the key fob 102 and/or vehicle-mounted UWB transceiver 104 includes transceiver circuitry and an associated antenna 141 that detect and quantify an UWB signal.

The vehicle-mounted UWB transceiver 104, also referred to as a responder apparatus or second UWB wireless transceiver, operates as an antenna anchor or related device that detects UWB pulses or related signals emitted by the key fob 102 and forwards them to the BCM 110 or other on-board vehicle computer, location sensor, or the like for calculating positions of the key fob 102. Signals exchanged with the key fob 102 and output via the transmission channel 110 are part of a ranging operation to provide spatial awareness and relative positioning with accuracy among the UWB apparatuses 102, 104 of the system 10.

In order to detect, demodulate, and/or decode signals received from the key fob 102, a UWB transceiver 104 also includes the antenna 141, which detects and quantifies an UWB signal via a transmission channel 110, and generates signals for localizing the key fob 102. In some embodiments, the antenna 141 may be similar to or the same as the antenna 121 of the key fob 102 for performing a UWB signal exchange. The antenna 141 may communicate with a signal detector 142 that may be part of a radio frequency (RF) subsystem or related analog frontend. The signal detector 142 in the analog domain may include an analog-to-digital converter (ADC) and a digital-to-analog converter (DAC) for electronic communication with a ranging processor 144 or the like. For example, the signal detector 142 detects and quantifies the signals received by the UWB transceiver 104 via the antenna 141, for example, energy levels, power spectral density and so on. More specifically, the ranging processor 144 is preferably constructed and arranged to detect and amplify the UWB signal, and to generate at least one CIR from a UWB signal. In doing so, the ranging processor 144 can be part of a baseband subsystem or the like for executing digital receiver algorithms for performing ToA measurements or related distance determination or ranging sequence calculations.

In some embodiments, the UWB transceiver 104 includes a CIR feature processor 146 that extracts features of the CIR for analysis of a filtered CIR and subsequent processing by a machine learning classification algorithm, for example, executed by a machine learning computer 148, for example, to distinguish reflections in the CIR signal required for identifying a first path in an otherwise dense multipath environment. In some embodiments, the machine learning computer 148 includes a special-purpose hardware processor that executes some or all of a machine learning algorithm within the housing or enclosure 143 of the UWB transceiver 104. The machine learning code is stored at a memory of and executed by a hardware computer processor of the machine learning computer 148 of the transceiver 104. In other embodiments, the CIR feature processor 146 is part of a remote special-purpose computer that communicates electronically with the UWB transceiver 104 to receive and process the CIR data. In other embodiments, the machine learning computer 148 may be remote from the UWB transceiver 104 and communicate with the CIR feature processor 146. Here, some portions of a machine learning algorithm may be executed in the CIR feature processor 146 and other portions of the machine learning algorithm are performed at the remote machine learning computer. In the embodiments where in the machine learning computer 148 is housed at or otherwise part of the UWB transceiver 104, a single machine learning classifier is executed for each transceiver 104 operating as a UWB anchor for classifying CIR features of interest at the node. In the embodiments where there is a single classifier for multiple anchors, the machine learning computer 148 is separate from the anchors so that the single classifier exchanges decision data or the like with each and every anchor to which it is connected.

Figure 5:
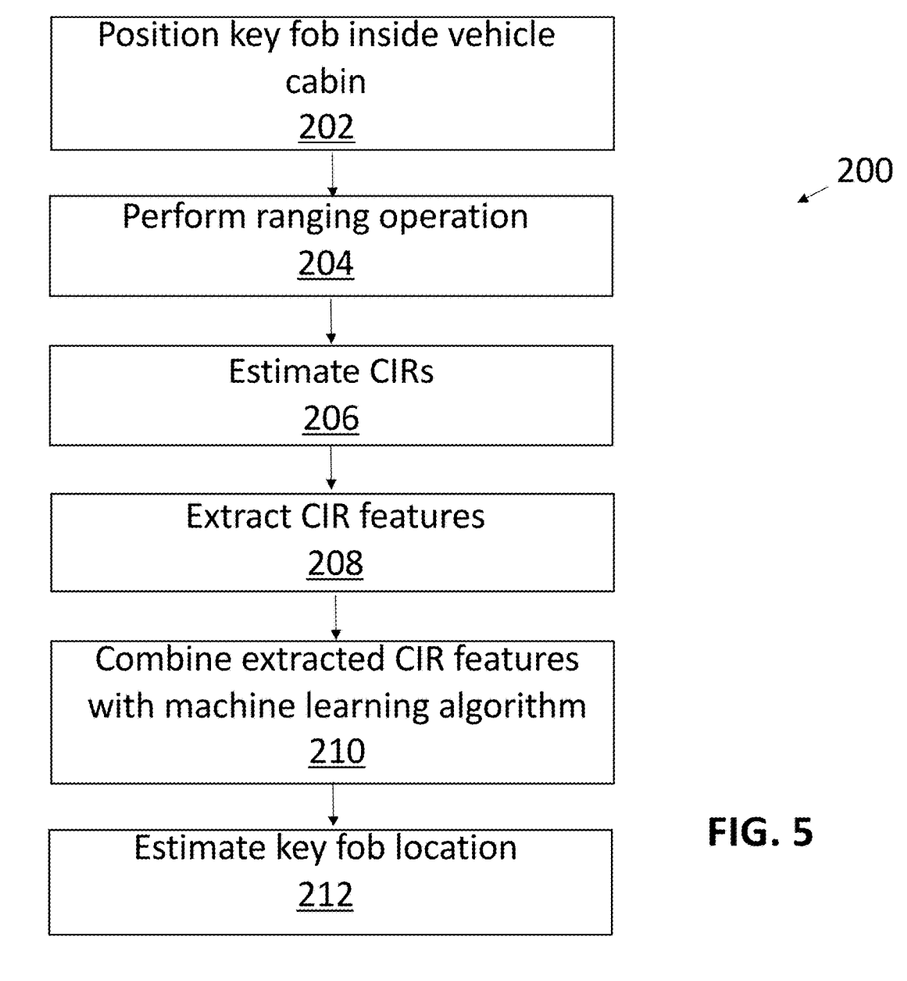
FIG. 5 is a flowchart illustrating a method for localizing a key fob inside a vehicle cabin, in accordance with some embodiments.

FIG. 5 is a flowchart illustrating a method 200 for localizing a key fob inside a vehicle cabin, in accordance with some embodiments. In describing the method 200, reference is made to some or all elements of the UWB communication system 10 of FIGS. 3 and 4. Accordingly, some or all steps of the method 200 may be executed by elements of the UWB communication system 10 of FIGS. 3 and 4.

At block 202, a key fob 102 is inside a cabin, cockpit, galley, or other enclosed or partially enclosed region of an automobile, airplane, boat, or other vehicle having reflective surfaces that may create interference or other signal distortion at a UWB transceiver 104 inside the cabin or related enclosure. The key fob 102 may be positioned in a particular region, such as a seat, floor, dashboard, and so on of the vehicle cabin or related enclosure.

At block 204, a ranging operation is performed. In some embodiments, prior to or included in the ranging operation, a boot process is executed by the key fob 102, transceivers 104, and/or third party or intervening apparatus. For purposes of describing the method 200, reference is made to the key fob 102, notwithstanding that the method 200 can equally apply to the transceiver 104. For example, referring to FIG. 3, the boot routine may be stored in a memory of the key fob 102, but not limited thereto, so that a processor of the key fob 102 can execute the stored routine, which may include a sequence of instructions, for example, to clear a cache of the apparatus 102 to bring the key fob 102 into a state of operability. The key fob 102 is pre-configured, e.g., pre-programmed by a software program, for full device performance in a manner that produces the best possible performance by the UWB device. For example, the key fob 102 may be configured for parameters, for example, in compliance with the IEEE 802.15.4 standard to allow the initiator apparatus 102 and transceiver 104 to communicate. When the ranging operation is performed, for example, distance measurements are determined such as ToA, time of flight (ToF), time difference of arrival (TDoA), angle of arrival (AoA), and so on, between the key fob 102 and the transceiver 104 for positioning and location tracking applications or the like.

At block 206, one or more CIRs are estimated. For example, referring again to FIGS. 1-3, CIRs can be measured at one or more positions of the key fob 102 with respect to the transceiver 104 at the automobile 12. The estimated CIRs include location-dependent features or characteristics that at block 208 can be extracted from the CIR by the system 10, for example, the CIR feature processor 146 of the UWB transceiver 104 for subsequent processing.

At block 210, a machine learning algorithm is provided to analyze not only a measured distance from the CIR, but also to combine the analyzed distance with features extracted from the CIR. In particular, machine learning contributes to localizing a key fob inside a vehicle cabin. In doing so, a supervised learning algorithm may be implemented in hardware and/or software that identifies the location of the key fob 102 during training. At least one CIR is processed to generate data for a classification algorithm. The CIR gives a characteristic of the "channel" and can be analyzed to determine the number of reflections, how close (in time and space) they are, the intensity of the reflections, and how they are combined at the receiver 104. The CIR "fingerprint" is different for many locations, since the signal path from transmitter to receive can be very different for different location for the transmitter and receiver. A machine learning algorithm will be able to extract features from the CIR and using supervised learning to "learn" how the CIR changes from location to location and perform localization using CIR characteristics. Unlike deep learning algorithms, the CIR feature extracting machine learning algorithms do not include numerous layers of algorithms where each provides a different interpretation to the data it processes, and where the layers of algorithms are arranged in a complex, processor-intensive network. Therefore, smaller processing requirements are necessary for executing the CIR feature extracting machine learning algorithms as compared to the greater processing requirements necessary for multi-layer deep learning algorithms.

In some embodiments, block 210 includes the identification of classification algorithms that are applicable and practical to execute. The selected classification algorithm receives the CIR features as inputs and generates as an output at block 212, an estimated location of the key fob. In particular, the key fob is localized in an in-vehicle environment in response to a combination of CIR feature extraction and machine learning processing. Example classification algorithms may include but not be limited to Neural Network, Support Vector Machine (SVM), linear discriminant, decision tree, k-nearest neighbor (KNN), and so on. For example, KNN may be applied to a dataset of CIR features, estimated distances, and various location-related measurements, and estimate locations of a key fob inside a vehicle in a new dataset where CIR measurements are input to this classification algorithm, which in turn outputs the location estimation.

Figure 6:
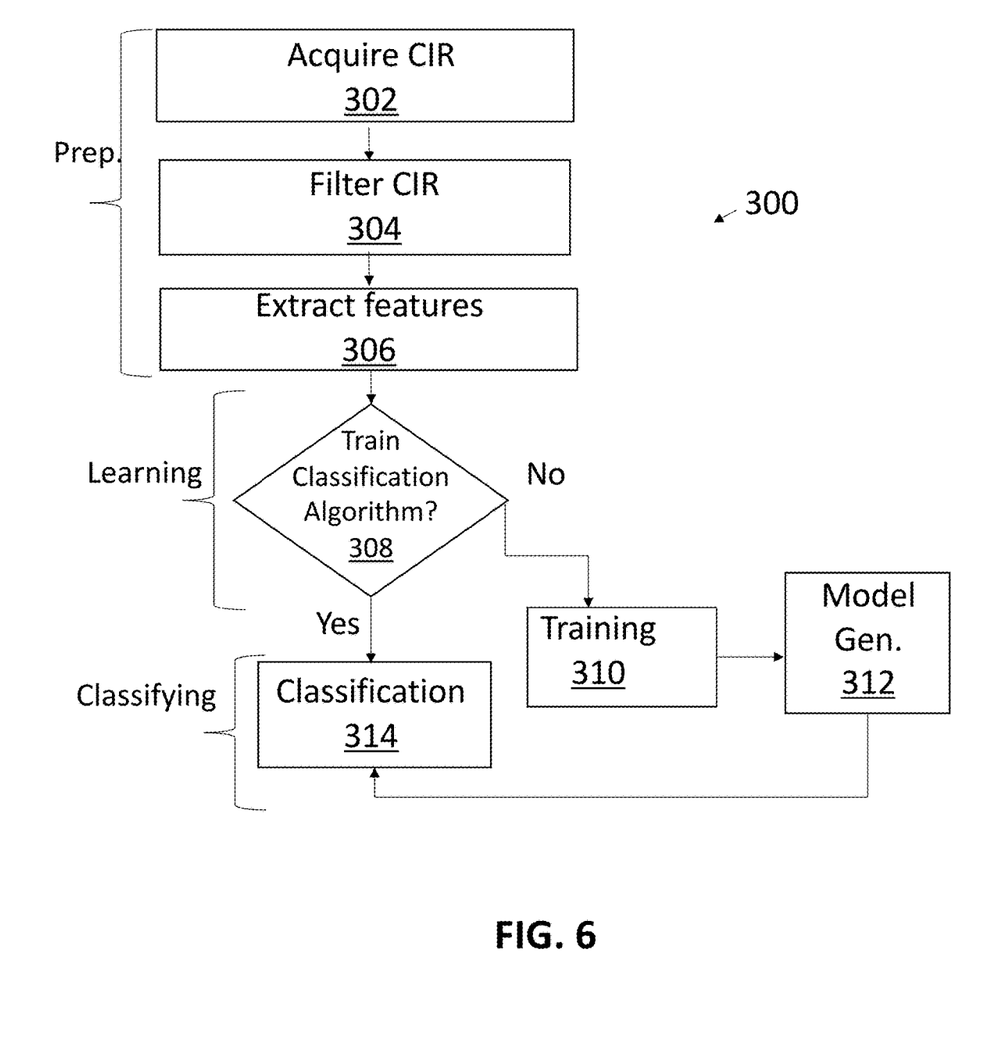
FIG. 6 is a flowchart illustrating a method for training a machine learning classification algorithm to localize a key fob, in accordance with some embodiments.

FIG. 6 is a flowchart illustrating a method 300 for training a machine learning classification algorithm to localize a key fob, in accordance with some embodiments. In describing the machine learning technique 300, reference is made to some or all elements of the UWB communication system 10 of FIGS. 3 and 4. Accordingly, some or all steps of the method 300 may be executed by elements of the UWB communication system 10 of FIGS. 3 and 4.

Blocks 302-306 of method 300 may be part of a preprocessing function, where data is arranged in a training dataset and a test dataset of a machine learning algorithm. Here, CIR features are extracted, normalized, filtered, and labeled, for example, by the CIR feature processor 146 of the UWB anchor 104. Blocks 308-314 may be part of a learning function. Other machine learning steps such as model evaluation and prediction may follow the method 300.

In particular, at block 302, at least one CIR is acquired. For example, a CIR can be computed for a data exchange between the key fob 102 and UWB anchors 104 shown in FIGS. 3 and 4, respectively. For example, as part of a ranging sequence, a message including a UWB preamble is output from a ranging initiator apparatus such as the key fob 102 and received by a responder apparatus such as the UWB anchor 104 which processes the preamble to generate a CIR.

At block 304, the CIR can be filtered to reduce the complexities associated with subsequent extraction step 306. For example, portions of a CIR outside a relevant region 1 in FIG. 1 or region 2 in FIG. 2 may be filtered so that contents of the relevant region 1, 2 for extraction such as peaks, leading edges, energy levels, and so on.

Figure 7:
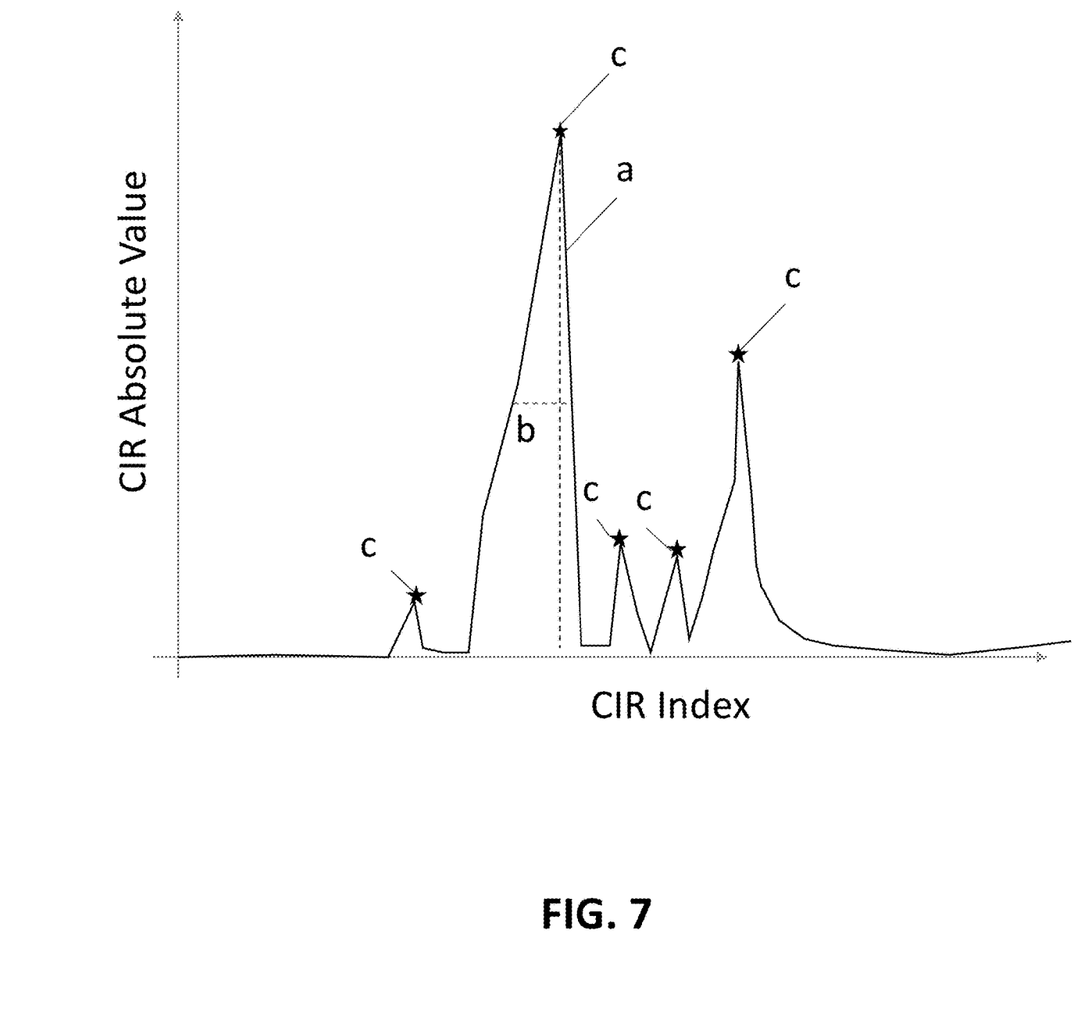
FIG. 7 is a graph illustrating features of a CIR selected for preprocessing according to the machine learning technique of FIG. 6.

At block 306, features of the CIR are extracted, which includes an identification and analysis of the filtered CIR, and mathematical operations in the time or frequency domain are performed. Identified and extracted features may include but not be limited to the number of peaks in the CIR, a first path peak/max peak ratio, a first path peak, maximum peak distance, width, and/or prominence, CIR energy, CIR spectral power, first path peak skewness, and kurtosis. FIG. 7 illustrates a graph of features, including first path prominence (a), width (b), and number of peaks (c) extracted in a preprocessing step. In some embodiments, a feature may include an estimated distance. Regardless of whether the estimated distance is accurate, it may be used by a machine learning classification algorithm for training and so on. In some embodiments, CIR features are labeled for localizing a fob key in a sufficient manner for the machine learning algorithm to learn, and to process recognized labels, and classify other CIR data per the features it learned through the labels.

The machine learning algorithm applied to the extracted CIR features does not require structured or labeled data to classify CIRs. For example, embodiments include the generation of structured data for the machine learning algorithm to learn, for example, labeled data for training. As described herein, a classifier can classify the fob key data from the features it learned through the labels. This distinguishes from a complex multi-layer network application, which relies on process-intensive deep learning algorithms to output its data input through different layers of the hierarchical network.

At decision diamond 308, a determination is made whether the classification algorithm is trained. In some embodiments, supervised learning is performed where the algorithm recognizes the fob key location during training, and as previously described in blocks 304 and 306, the CIR is processed to generate data for the classification algorithm. Here, supervised learning requires that the algorithm's possible outputs are already known and that the CIR data used to train the algorithm is labeled.

In some embodiments, a model must be generated for the classification algorithm, and therefore, a training step is performed (block 310) followed by a model generation process (block 312). Once the model is generated, the classifier can output the labels as part of new data. In other embodiments, the training algorithm receives (from block 306) as an input labelled features in cases where a location is specified, and returns as an output a model for the selected classifier, which is used to classify the data (block 314). Example classifiers applied to the extracted CIR features may include but not be limited to a Support Vector Machine, k Nearest Neighbor (KNN), Naïve Bayes, Decision Tree, Random Forest, Neural Network, and so on. In some embodiments, following the model training/learning algorithm process, the model is evaluated against a test data set provided as part of the abovementioned preprocessing steps and directly input to the model as part of the model evaluation process.

Another feature of the learning steps in method 300 according to embodiments of the inventive concept is that few classifiers are selected for initial tests, and therefore, fewer UWB anchors 104 are required. In some embodiments, one anchor can collect data from other anchors, then execute a machine learning algorithm locally at the representative anchor. The representative in turn can output request signals or the like to the BCM 106 or other automobile control processor to unlock the vehicle doors and so on. The decision tree or other machine language program may be implemented with less complexity and greater simplicity than the complex decision functions of a deep learning algorithm, which can therefore be processed at a particular UWB anchor 104. Accordingly, in cases where a decision is made at each individual anchor by a single anchor classifier, a decision can be taken.

As will be appreciated, embodiments as disclosed include at least the following. In one embodiment, a system for localizing an ultra-wide band (UWB) apparatus comprises a UWB transceiver that identifies and extracts features of at least one channel impulse response (CIR); and a special-purpose processor that applies a machine learning classification process to the extracted CIR features to localize the UWB apparatus in a vehicle.

Alternative embodiments of the system include one of the following features, or any combination thereof. The UWB apparatus is a key fob. The UWB transceiver includes a CIR feature processor that extracts the features of the CIR for analysis and subsequent processing by the machine learning classification process. The machine learning computer distinguishes reflections in the CIR required for identifying a first path in a dense multipath environment of the vehicle. The CIR feature processor further normalizes, filters, and or labels the CIR in a classifying phase of a process performed by the system. The UWB transceiver comprises: an antenna a ranging processor that generates the CIR from a UWB signal received by the antenna from the UWB apparatus; and a signal detector that detects and quantifies the UWB signal received by the UWB transceiver. The UWB transceiver includes an enclosure and the special-purpose processor is enclosed in the enclosure. The special-purpose processor applies a single classifier of the machine learning classification process to the extracted CIR features. The special-purpose processor is constructed and arranged to receive and process distance data regarding the UWB apparatus for training the machine learning classification process to distinguish locations of the UWB apparatus inside the vehicle.

In another embodiment, an ultra-wideband (UWB) wireless communication system comprises a key fob that outputs a UWB signal; at least one anchor that participates in a ranging sequence with the key fob, which includes generating at least one channel impulse response (CIR) from the UWB signal and extracts features of the at least one CIR; and a special purpose processor that applies a machine learning classification process to the extracted CIR features to localize the key fob.

Alternative embodiments of the system include one of the following features, or any combination thereof. The at least one anchor includes a plurality of anchor devices, each storing and processing a classifier of the machine learning classification process to the CIR features. The machine learning classification process selects the CIR features to train the classifier. The machine learning classification executes the training algorithm returns as an output a model for the classifier, which is used to classify data of the CIR features. The machine learning computer distinguishes reflections in the at least one CIR required for identifying a first path in a dense multipath environment of the vehicle. The at least one anchor device comprises an antenna a ranging processor that generates the at least one CIR from a UWB signal received by the antenna; a signal detector that detects and quantifies the UWB signal received by the UWB transceiver; and a CIR feature processor that extracts the features of the at least one CIR. At least one anchor device includes an enclosure and the special-purpose processor is enclosed in the enclosure.

In another embodiment, a method for localizing an ultra-wide band (UWB) apparatus comprises outputting, from the UWB apparatus to a UWB transceiver a UWB signal; extracting, by the UWB transceiver, features of at least one channel impulse response (CIR) of the UWB signal; and applying, by a special-purpose processor a machine learning classification process to the extracted CIR features to localize the UWB apparatus in a vehicle.

Alternative embodiments of the system include one of the following features, or any combination thereof. The method further comprises processing the CIR to distinguish reflections in the CIR of the UWB signal; and identifying a first path in a dense multipath environment of the UWB apparatus. Processing the CIR further comprises generating data for the machine learning classification process. The machine learning classification process executes a training algorithm to return a model for a classifier a classifier of the machine learning classification process for classifying the CIR features. The machine learning classification process estimates a location of the UWB apparatus in a vehicle cabin.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for localizing a moveable ultra-wide band (UWB) apparatus which transmits a UWB signal, comprising:
   a CIR feature processor that identifies and extracts features of a plurality of channel impulse responses (CIRs) each CIR corresponding to the UWB signal received by a respective anchor of a plurality of anchors; and
   a special-purpose processor that applies a machine learning classification process to the extracted CIR features to localize the UWB apparatus in a vehicle, wherein the special-purpose processor is arranged to receive estimated distance data of the UWB apparatus and train the machine learning classification process based on the estimated distance data and the extracted CIR features of the CIRs to form a model which indicates a particular location of the UWB apparatus within the vehicle from locations inside the vehicle based on CIRs input to the model, wherein the model receives the input CIRs and outputs a distance between the UWB apparatus and the UWB transceiver based on a number of peaks, a peak to maximum peak ratio, a maximum peak width, a peak skewness, and peak kurtosis which are features extracted from the CIRs input.

2. An ultra-wideband (UWB) wireless communication system, comprising:
   a key fob that outputs a UWB signal;
   at least one anchor device that participates in a ranging sequence with the key fob, which includes generating a plurality of channel impulse responses (CIRs) each CIR corresponding to the UWB signal received by a respective anchor of a plurality of anchors;
   a CIR feature processor arranged to extract features of the CIRs; and
   a special purpose processor that applies a machine learning classification process to the extracted CIR features to localize the key fob in a vehicle, wherein the special-purpose processor is arranged to receive estimated distance data of the key fob and train the machine learning classification process based on the estimated distance data and the extracted CIR features of the CIRs to form a model which indicates a particular location of the UWB apparatus within the vehicle from locations inside the vehicle based on CIRs input to the model, wherein the model receives the input CIRs and outputs a distance between the UWB apparatus and the UWB transceiver based on a number of peaks, a peak to maximum peak ratio, a maximum peak width, a peak skewness, and peak kurtosis which are features extracted from the CIRs input.

3. A method for localizing a moveable ultra-wide band (UWB) apparatus, comprising:
   outputting, from the UWB apparatus to a UWB transceiver a UWB signal;
   extracting, by a CIR feature processor, features of a plurality of channel impulse responses (CIRs) each CIR corresponding to the UWB signal received by a respective anchor of a plurality of anchors; and applying, by a special-purpose processor a machine learning classification process to the extracted CIR features to localize the UWB apparatus in a vehicle, wherein the special-purpose processor is arranged to receive estimated distance data of the UWB apparatus and train the machine learning classification process based on the estimated distance data and the extracted CIR features of the CIRs to form a model which indicates a particular location of the UWB apparatus within the vehicle from locations inside the vehicle based on CIRs input to the model, wherein the model receives the input CIRs and outputs a distance between the UWB apparatus and the UWB transceiver based on a number of peaks, a peak to maximum peak ratio, a maximum peak width, a peak skewness, and peak kurtosis which are features extracted from the CIRs input.

4. The system of claim 1, wherein the UWB apparatus is a key fob.

5. The system of claim 1, wherein a UWB transceiver includes the CIR feature processor that extracts the features of the at least one CIR for analysis and subsequent processing by the machine learning classification process.

6. The system of claim 5, wherein the machine learning computer distinguishes reflections in the at least one CIR required for identifying a first path in a dense multipath environment of the vehicle.

7. The system of claim 5, wherein the CIR feature processor further normalizes, filters, and or labels the at least one CIR.

8. The system of claim 1, wherein a UWB transceiver comprises:
   an antenna
   a ranging processor that generates the at least one CIR from a UWB signal received by the antenna from the UWB apparatus; and
   a signal detector that detects and quantifies the UWB signal received by the UWB transceiver.

9. The system of claim 8, wherein the UWB transceiver includes an enclosure and the special-purpose processor is enclosed in the enclosure.

10. The system of claim 9, wherein the special-purpose processor applies a single classifier of the machine learning classification process to the extracted CIR features.

11. The UWB wireless communication system of claim 2, wherein the at least one anchor includes a plurality of anchor devices, each storing and processing a classifier of the machine learning classification process to the CIR features.

12. The UWB wireless communication system of claim 11, wherein the machine learning classification process selects the CIR features to train the classifier.

13. The UWB wireless communication system of claim 12, wherein the machine learning classification process executes the training algorithm returns as an output the model for the classifier, which is used to classify data of the CIR features.

14. The UWB wireless communication system of claim 2, wherein the machine learning computer distinguishes reflections in the at least one CIR required for identifying a first path in a dense multipath environment of the vehicle.

15. The UWB wireless communication system of claim 2, wherein the at least one anchor device comprises:
   an antenna
   a ranging processor that generates the at least one CIR from a UWB signal received by the antenna;
   a signal detector that detects and quantifies the UWB signal received by the UWB transceiver; and
   a CIR feature processor that extracts the features of the at least one CIR.

16. The UWB wireless communication system of claim 2, wherein the at least one anchor device includes an enclosure and the special-purpose processor is enclosed in the enclosure.

17. The method of claim 3, further comprising: processing the CIR to distinguish reflections in the CIR of the UWB signal; and identifying a first path in a dense multipath environment of the UWB apparatus.

18. The method of claim 17, wherein processing the CIR further comprises generating data for the machine learning classification process, and wherein the machine learning classification process executes a training algorithm to return the model for a classifier of the machine learning classification process for classifying the CIR features.

* * * * *